(12) United States Patent
Kawakubo et al.

(10) Patent No.: US 7,619,349 B2
(45) Date of Patent: Nov. 17, 2009

(54) PIEZOELECTRIC DRIVEN MEMS DEVICE

(75) Inventors: Takashi Kawakubo, Yokohama (JP);
Toshihiko Nagano, Kawasaki (JP);
Michihiko Nishigaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 424 days.

(21) Appl. No.: 11/687,707

(22) Filed: Mar. 19, 2007

(65) Prior Publication Data
US 2008/0042521 A1 Feb. 21, 2008

(30) Foreign Application Priority Data
Jun. 23, 2006 (JP) .............................. 2006-173605

(51) Int. Cl.
*H01L 41/08* (2006.01)

(52) U.S. Cl. ........................ 310/328; 310/330; 310/331; 310/367

(58) Field of Classification Search ................. 310/328, 310/330–332, 367
See application file for complete search history.

(56) References Cited

U.S. PATENT DOCUMENTS

| | | | | |
|---|---|---|---|---|
| 3,646,413 A * | 2/1972 | Oomen | ........................ | 361/281 |
| 4,785,215 A * | 11/1988 | Blech | ........................ | 310/329 |
| 5,276,672 A * | 1/1994 | Miyazaki et al. | ............. | 369/126 |
| 5,633,554 A * | 5/1997 | Kaji | ............................. | 310/328 |
| 6,107,726 A * | 8/2000 | Near et al. | ................... | 310/328 |
| 6,359,374 B1 * | 3/2002 | Dausch et al. | ............... | 310/330 |
| 7,005,781 B2 * | 2/2006 | Smits | ........................... | 310/331 |
| 2003/0223174 A1 | 12/2003 | Prophet | | |
| 2005/0194867 A1 | 9/2005 | Kawakubo et al. | | |
| 2005/0242687 A1 | 11/2005 | Kawakubo et al. | | |
| 2006/0055287 A1 | 3/2006 | Kawakubo et al. | | |
| 2006/0067840 A1 | 3/2006 | Kawakubo et al. | | |
| 2006/0285255 A1 | 12/2006 | Kawakubo et al. | | |
| 2007/0228887 A1 | 10/2007 | Nishigaki et al. | | |

FOREIGN PATENT DOCUMENTS

| | | |
|---|---|---|
| DE | 43 05 033 | 10/1993 |
| JP | 05-347439 | 12/1993 |
| JP | 07-124103 | 5/1995 |
| JP | 2006-087231 | 3/2006 |
| WO | 2005-059933 | 6/2005 |

OTHER PUBLICATIONS

Japanese Office Action dated Jan. 23, 2009 corresponding to U.S. Appl. No. 11/687,707 filed Mar. 19, 2007.
Japanese Office Action dated Aug. 29, 2008 corresponding to U.S. Appl. No. 11/687,707 filed Mar. 19, 2007.
European Search Report for EP 07 00 5567 dated Jul. 20, 2007 corresponding to U.S. Appl. No. 11/687,707 filed Mar. 19, 2007.

* cited by examiner

*Primary Examiner*—Mark Budd
(74) *Attorney, Agent, or Firm*—Turocy & Watson, LLP

(57) ABSTRACT

It is made possible to provide a piezoelectric driven MEMS device having the distance between the action end and the fixed electrode which is kept constant regardless of whether the residual strain is large or small and having a mechanism which is excellent in reproducibility and reliability. Two piezoelectric driven actuators each having a folded beam structure are disposed in parallel and in a line-symmetric manner, and connected to each other in the vicinity of an action end.

21 Claims, 13 Drawing Sheets

C-C' SECTION

PIEZOELECTRIC DRIVEN MEMS DEVICE

CROSS-REFERENCE TO RELATED APPLICATION

This application is based upon and claims the benefit of priority from prior Japanese Patent Application No. 2006-173605 filed on Jun. 23, 2006 in Japan, the entire contents of which are incorporated herein by reference.

BACKGROUND OF THE INVENTION

1. Field of the Invention

The present invention relates to a piezoelectric driven MEMS device.

2. Related Art

Recently, variable capacitors and switches using actuators fabricated by using the MEMS (Micro-electro-mechanical System) technique are drawing the attention. A movable electrode is formed on a beam which is supported in the air over a substrate. A fixed electrode is formed on an opposed substrate. The beam is driven by electrostatic force, electrothermal force, electromagnetic force, piezoelectric force, and so on. The distance between the movable electrode and the fixed electrode is changed. A variable capacitor or a switch is thus formed.

Especially in a variable capacitor or a switch which uses an inverse piezoelectric effect as drive force for the movable beam, the spacing between the movable electrode and the fixed electrode can be changed sharply and continuously, and consequently the capacitance change rate can be made large. Furthermore, since air or gas is used as a dielectric, a very large Q factor is obtained. Thus, there are a large number of advantages.

Furthermore, it is also possible to cause the variable capacitor structure to function as a switch by using it as it is and bringing the movable electrode into contact with the fixed electrode via an extremely thin dielectric film (capacitive type) or bringing the movable electrode into contact with the fixed electrode directly (DC type). Such a switch fabricated by using the MEMS technique has both low on-resistance and high off-time insulation isolation characteristics as compared with the semiconductor switch, and consequently it is also drawing keen attention.

However, the MEMS device using the piezoelectric drive mechanism is supported in the air, and has a long thin beam structure including a piezoelectric film interposed between upper and lower electrodes. Therefore, there is a very serious problem that the beam is warped upward or downward by slight residual stress in the material of the beam. As a result, it is very difficult to adjust the capacitance value of the variable capacitance obtained before and after applying the voltage in conformity with the design and keep the drive voltage of the switch at a constant value.

A magnitude of a movable displacement at an action end of a piezoelectric driven actuator is approximated by the following expression.

$$\text{Displacement caused by electrostrictive effect} \sim E \cdot d_{31} \cdot L^2 \cdot t^{-1} \quad (1)$$

Here, E is an electric field applied to the piezoelectric film, $d_{31}$ is an electrostrictive constant, L is the length of the actuator, and t is the thickness of the actuator.

On the other hand, denoting residual strain by $\epsilon_r$, warp of the piezoelectric driven actuator caused by residual strain which is generated in the piezoelectric film is approximated by the following expression.

$$\text{Warp caused by residual strain} \sim \epsilon_r \cdot L^2 \cdot t^{-1} \quad (2)$$

As appreciated by comparing the expression (2) with the expression (1), they have similar relations. The displacement and the warp are in proportion to the square of the length of the actuator, and are inverse proportion to the thickness. In other words, if the length of the actuator is increased or the thickness is decreased in order to widen the drive range of the piezoelectric driven actuator, the quantity of the warp also increases accordingly. In making the piezoelectric driven range greater than the warp, therefore, geometric contrivance concerning the actuator brings about little effect. There are no ways other than making the absolute value of the residual strain $\epsilon_r$ small as compared with the absolute value of strain $(E \cdot d_{31})$ caused by the electrostrictive effect.

For obtaining a fine film quality as regards PZT (lead zirconate titanate) known as a piezoelectric film material having a great electrostrictive effect, it is necessary to form a film at the room temperature and then conduct annealing at approximately 600° C. Since the volume contraction is caused by the annealing, the residual strain increases inevitably.

On the other hand, AlN (aluminum nitride) and ZnO (zinc oxide) used as the material of the piezoelectric film, which can be formed near at the room temperature and can be controlled in residual strain comparatively precisely by using the film forming condition at the time of film forming, are smaller in electrostrictive effect by at least one order than PZT.

Therefore, there are conflicting problems: a material that is great in electrostrictive effect is difficult to control the residual strain and a material that is comparatively easy in control of residual strain is small in electrostrictive effect. This is one of the greatest problems that obstruct industrial application of the piezoelectric driven MEMS device.

The present inventors have already devised a piezoelectric driven actuator having a folded structure in order to cope with this problem (see JP-A 2006-87231 (KOKAI)). The piezoelectric driven actuator having the folded structure includes a first beam which has a first end fixed to a substrate, a second end serving as a connection end, and a piezoelectric film interposed between a pair of electrode films, a second beam which has a first end serving as a connection end and a second end serving as an action end, which extends in a direction opposite to that of the first beam, and which has basically the same structure and dimensions as those of the first beam, and a fixed electrode disposed on the substrate so as to be opposed to the action end. In other words, two beams having the same structure and shape are disposed in parallel and ends of the two beams are connected together to form the folded structure. Even if warps are caused in the beams by residual strain at the time of film forming, therefore, the two beams warp in the same way. As a result, it becomes possible to cancel the warps. Thus, it has been anticipated that the distance between the action end of the piezoelectric driven actuator and the fixed end fixed to the substrate is kept substantially constant and consequently stable operation is made possible.

As a result of subsequent repetition of trial production and study conducted by the present inventors, it has become clear that it is possible in the simple folded structure or a folded structure having two forward beams on both sides and one backward beam in the center to reduce the warp caused at the action end by residual stress to approximately one tenth of the warp at the folding end, but it is still difficult to further hold down the warp at the action end. In short, the beams warp in a paraboloidal form around the fixed end. Although warps in the length direction of the actuator (extension direction of the beams) are canceled by the folded structure, therefore, warps of the actuator in the lateral direction are present and the warps are not canceled.

SUMMARY OF THE INVENTION

The present invention has been made in view of these circumstances and an object of the present invention is to provide a piezoelectric driven MEMS device having the distance between the action end and the fixed electrode which is kept constant regardless of whether the residual strain is large or small and having a mechanism which is excellent in reproducibility and reliability.

A piezoelectric driven MEMS device according to a first aspect of the present invention includes: a substrate; a first actuator which comprises a first lower electrode, a first piezoelectric film formed on the first lower electrode, and a first upper electrode formed on the first piezoelectric film, and which has a first end fixed onto the substrate; a second actuator which is disposed on the substrate in parallel with the first actuator, and which comprises a second lower electrode, a second piezoelectric film formed on the second lower electrode, and a second upper electrode formed on the second piezoelectric film; a first connection portion which connects a second end of the first actuator to a first end of the second actuator opposed to the second end of the first actuator; a third actuator which is disposed on the opposite side of the second actuator from the first actuator and in parallel with the first actuator, which comprises a third lower electrode, a third piezoelectric film formed on the third lower electrode, and a third upper electrode formed on the third piezoelectric film, and which has a first end fixed onto the substrate; a fourth actuator which is disposed on the substrate between the second actuator and the third actuator and in parallel with the third actuator, which comprises a fourth lower electrode, a fourth piezoelectric film formed on the fourth lower electrode, and a fourth upper electrode formed on the fourth piezoelectric film; a second connection portion which connects a second end of the third actuator to a first end of the fourth actuator opposed to the second end of the third actuator; a third connection portion which connects a second end of the second actuator to a second end of the fourth actuator; and a fixed electrode formed on the substrate so as to be opposed to the second ends of the second actuator and the fourth actuator, the first actuator and the second actuator being disposed so as to be substantially symmetrical to the third actuator and the fourth actuator about a central line between the second actuator and the fourth actuator.

A piezoelectric driven MEMS device according to a second aspect of the present invention includes: a substrate; a first actuator which comprises a first lower electrode, a first lower piezoelectric film formed on the first lower electrode, a first intermediate electrode formed on the first lower piezoelectric film, a first upper piezoelectric film formed on the first intermediate electrode, and a first upper electrode formed on the first upper piezoelectric film, and which has a first end fixed onto the substrate; a second actuator which is disposed on the substrate in parallel with the first actuator, and which comprises a second lower electrode, a second lower piezoelectric film formed on the second lower electrode, a second intermediate electrode formed on the second lower piezoelectric film, a second upper piezoelectric film formed on the second intermediate electrode, and a second upper electrode formed on the second upper piezoelectric film; a first connection portion which connects a second end of the first actuator to a first end of the second actuator opposed to the second end of the first actuator; a third actuator which is disposed on the opposite side of the second actuator from the first actuator and in parallel with the first actuator, which comprises a third lower electrode, a third lower piezoelectric film formed on the third lower electrode, a third intermediate electrode formed on the third lower piezoelectric film, a third upper piezoelectric film formed on the third intermediate electrode, and a third upper electrode formed on the third upper piezoelectric film, and which has a first end fixed onto the substrate; a fourth actuator which is disposed on the substrate between the second actuator and the third actuator and in parallel with the third actuator, which comprises a fourth lower electrode, a fourth lower piezoelectric film formed on the fourth lower electrode, a fourth intermediate electrode formed on the fourth lower piezoelectric film, a fourth upper piezoelectric film formed on the fourth intermediate electrode, and a fourth upper electrode formed on the fourth upper piezoelectric film; a second connection portion which connects a second end of the third actuator to a first end of the fourth actuator opposed to the second end of the third actuator; a third connection portion which connects a second end of the second actuator to a second end of the fourth actuator; and a fixed electrode formed on the substrate so as to be opposed to the second ends of the second actuator and the fourth actuator, the first actuator and the second actuator being disposed so as to be substantially symmetrical to the third actuator and the fourth actuator about a central line between the second actuator and the fourth actuator.

A piezoelectric driven MEMS device according to a third aspect of the present invention includes: a substrate; a first actuator which comprises a first lower electrode, a first piezoelectric film formed on the first lower electrode, and a first upper electrode formed on the first piezoelectric film, and which has a first end fixed onto the substrate; a second actuator which is disposed on the substrate in parallel with the first actuator, and which comprises a second lower electrode, a second piezoelectric film formed on the second lower electrode, and a second upper electrode formed on the second piezoelectric film; a first connection portion which connects a second end of the first actuator to a first end of the second actuator opposed to the second end of the first actuator; a third actuator which is disposed on the opposite side of the second actuator from the first actuator and in parallel with the first actuator, which comprises a third lower electrode, a third piezoelectric film formed on the third lower electrode, and a third upper electrode formed on the third piezoelectric film, and which has a first end fixed onto the substrate; a fourth actuator which is disposed on the substrate between the second actuator and the third actuator and in parallel with the third actuator, which comprises a fourth lower electrode, a fourth piezoelectric film formed on the fourth lower electrode, and a fourth upper electrode formed on the fourth piezoelectric film; a second connection portion which connects a second end of the third actuator to a first end of the fourth actuator opposed to the second end of the third actuator; a third connection portion which connects opposed side faces of the second actuator and the fourth actuator together; and a fixed electrode formed on the substrate so as to be opposed to second ends of the second actuator and the fourth actuator, the first actuator and the second actuator being disposed so as to be substantially symmetrical to the third actuator and the fourth actuator about a central line between the second actuator and the fourth actuator.

DETAILED DESCRIPTION OF THE INVENTION

Hereafter, embodiments of the present invention will be described in detail.

First Embodiment

Figure 1:
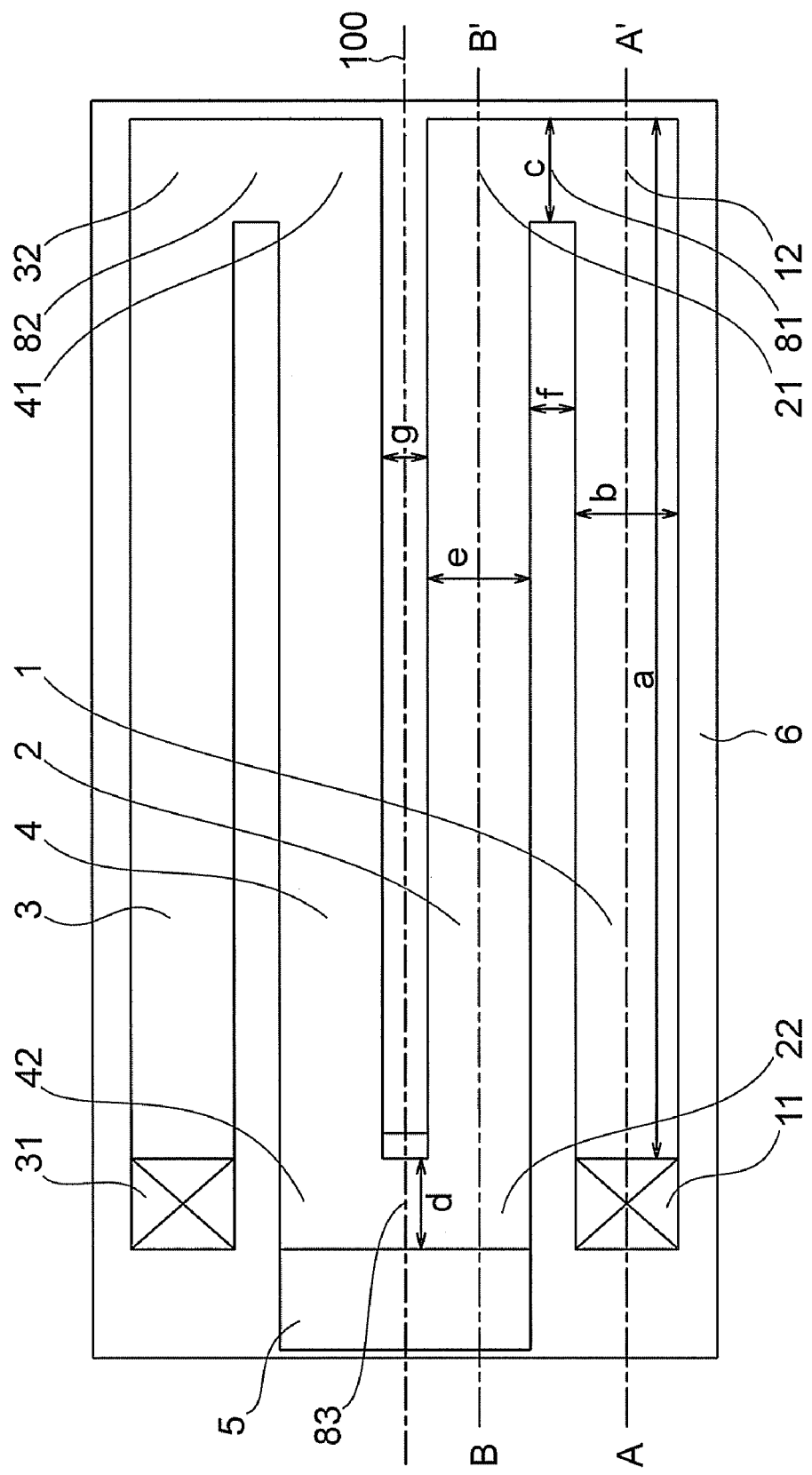
FIG. 1 is a plan view of a piezoelectric driven MEMS device according to a first embodiment of the present invention.

A piezoelectric driven MEMS device according to a first embodiment of the present invention will now be described with reference to FIGS. 1 to 5. The piezoelectric driven MEMS device according to the present embodiment is a variable capacitor, and includes first to fourth actuators 1, 2, 3 and 4 as shown in FIG. 1. The second to fourth actuators 2, 3 and 4 are provided in parallel with the first actuator 1, and have the same length (dimension in a direction of extension of the actuators (lengthwise direction)) as that of the first actuator 1. A first end of the first actuator 1 is a fixed end 11, and it is fixed to a substrate 6 through an anchor 71. A second end (connection end) 12 of the first actuator is connected to a first end 21 of the second actuator 2 by a first connection portion 81. A second end of the second actuator 2 is an action end 22, and a movable electrode is provided thereon. A first end of the third actuator 3 is a fixed end 31, and it is fixed to the substrate 6 through an anchor 72. A second end (connection end) 32 of the third actuator is connected to a first end 41 of the fourth actuator 4 by a second connection portion 82. A second end of the fourth actuator 4 is an action end 42, and a movable electrode is provided thereon. In addition, the action end 22 of the second actuator 2 is connected to the action end 42 of the fourth actuator 4 by a third connection portion 83.

In the present embodiment, the fixed end 31 is located on a straight line which passes through the fixed end 11 and which is substantially perpendicular to an extension direction of the first actuator 1. The length (size in the extension direction) of the first actuator 1 is substantially equal to the length of the third actuator 3. The width (size in a direction perpendicular to the extension direction) of the first actuator 1 is substantially equal to the width of the third actuator 3. The length of the second actuator 2 is substantially equal to the length of the fourth actuator 4. The width of the second actuator 2 is substantially equal to the width of the fourth actuator 4.

Figure 2:
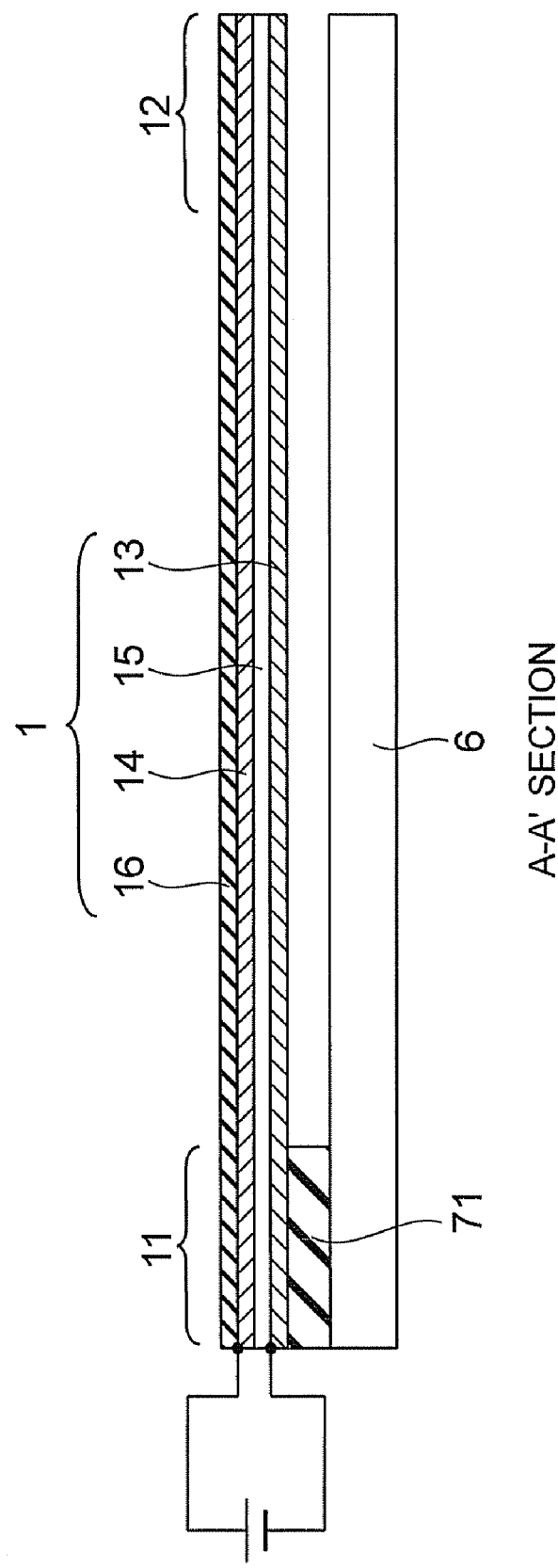
FIG. 2 is a sectional view of the piezoelectric driven MEMS device according to the first embodiment obtained by cutting it along a cut line A-A' shown in FIG. 1.
Figure 3:
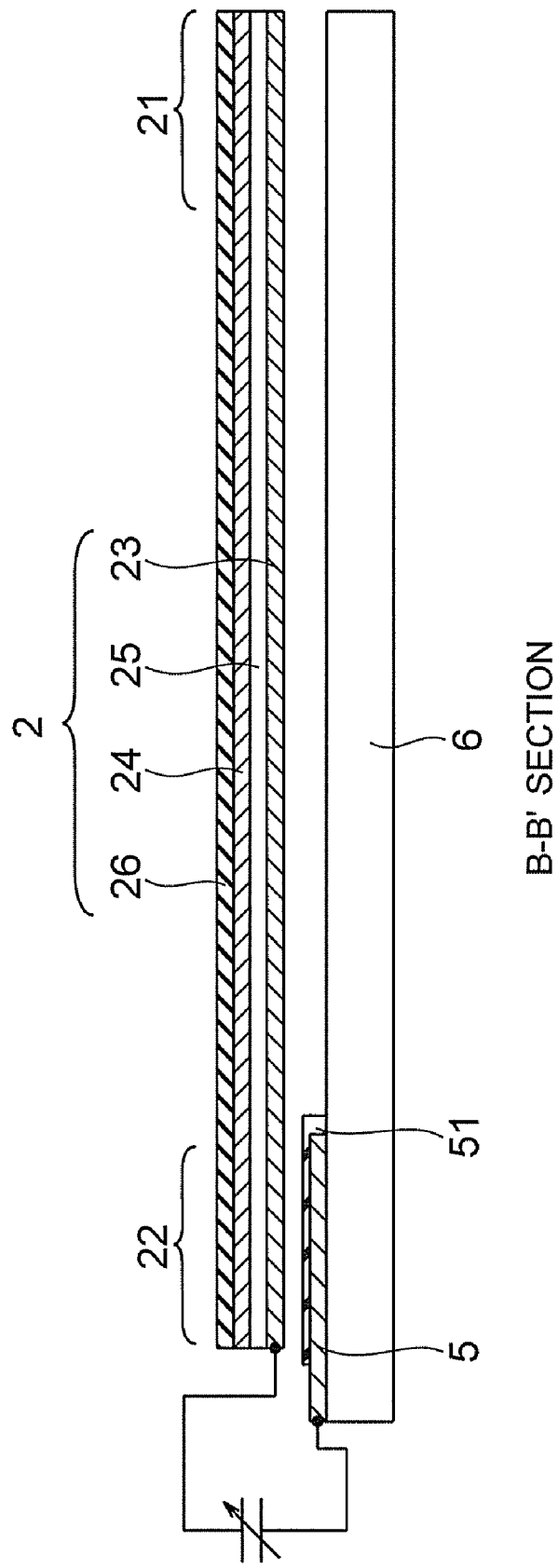
FIG. 3 is a sectional view of the piezoelectric driven MEMS device according to the first embodiment obtained by cutting it along a cut line B-B' shown in FIG. 1.

As shown in FIG. 2, the first actuator 1 has a unimorph structure obtained by laminating a lower electrode 13, a piezoelectric film 15, an upper electrode 14 and a support film 16 in the cited order. As shown in FIG. 3, the second actuator 2 has a unimorph structure obtained by laminating a lower electrode 23, a piezoelectric film 25, an upper electrode 24 and a support film 26 in the cited order. The lower electrode 23 is the same in layer as the lower electrode 13. The piezoelectric film 25 is the same in layer as the piezoelectric film 15. The upper electrode 24 is the same in layer as the lower electrode 14. Although not illustrated, the third actuator 3 has utterly the same structure as the first actuator 1, and the fourth actuator 4 has utterly the same structure as the second actuator 2. In other words, each of the third actuator and the fourth actuator includes a lower electrode, a piezoelectric film and an upper electrode which are the same in layer as the lower electrode 13, the piezoelectric film 15, and the upper electrode 14, respectively. As shown in FIG. 3, a fixed electrode 5 and a shortcircuit preventing dielectric film 51 are formed on the substrate 6 so as to be opposed to the action end 22 and the action end 42.

In the present embodiment, the first actuator 1 and the second actuator 2 are disposed so as to be line-symmetrical to the third actuator 3 and the fourth actuator 4 about a central line 100 between the second actuator 2 and the fourth actuator 4. As for examples of sizes of the actuators, a length "a" between the fixed end and the connection end 12 or 32 in each of the first and third actuators 1 and 3 is 440 μm, a width "b" of the first and third actuators 1 and 3 is 80 μm, a length "c" of the first and second connection portions 81 and 82 is 40 μm, a length "d" of the third connection portion 83 is 40 μm, a width "e" of the second and fourth actuators 2 and 4 is 80 μm, each of a distance (space) f between the first actuator 1 and the second actuator 2 and a distance f between the third actuator 3 and the fourth actuator 4 is 10 μm, and a distance g between the second actuator 2 and the fourth actuator 4 is 80 cm.

If vertically asymmetric residual strains are caused at the time of film forming, a warp is caused in each of the first to fourth actuators 1, 2, 3 and 4 according to the magnitude of the residual strain. With regard to the lengthwise direction of the actuators, however, the warp in the first actuator 1 and the warp in the second actuator 2 are canceled each other, and the warp in the third actuator 3 and the warp in the fourth actuator 4 are canceled each other. With regard to the lateral direction of the actuators, the first actuator 1 and the second actuator 2 are connected together by the first connection portion 81, the third actuator 3 and the fourth actuator 4 are connected together by the second connection portion 82, and the second actuator 2 and the fourth actuator 4 are connected together by the third connection portion 83. Owing to such a structure in the present embodiment, warps in the lateral direction are also canceled, and it becomes possible to keep the action end 22 and the action end 42 at substantially the same height as the fixed end 11 and the fixed end 31.

Figure 4:
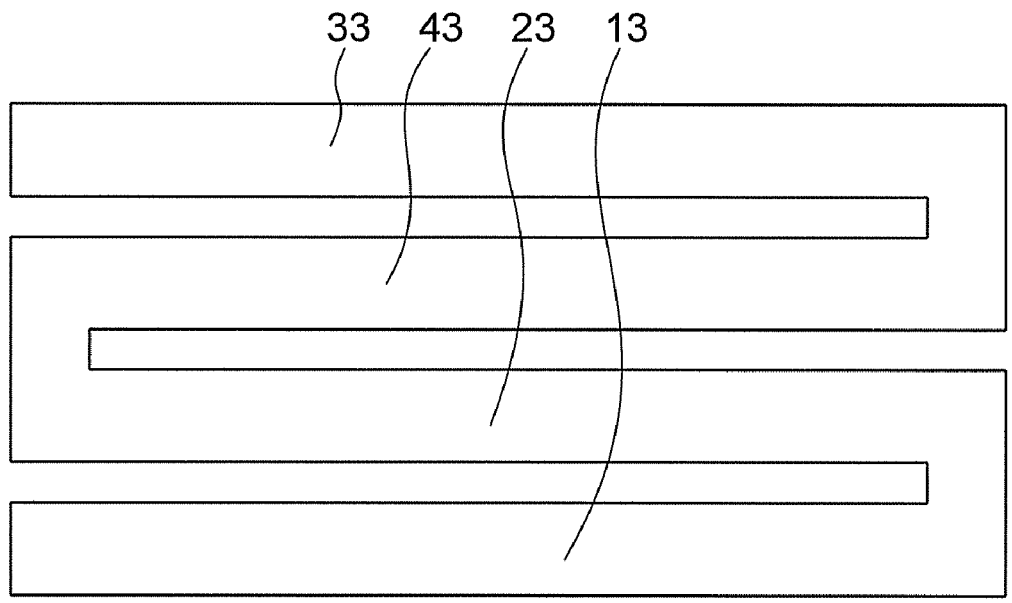
FIG. 4 is a plan view of a lower electrode in the first embodiment.
Figure 5:
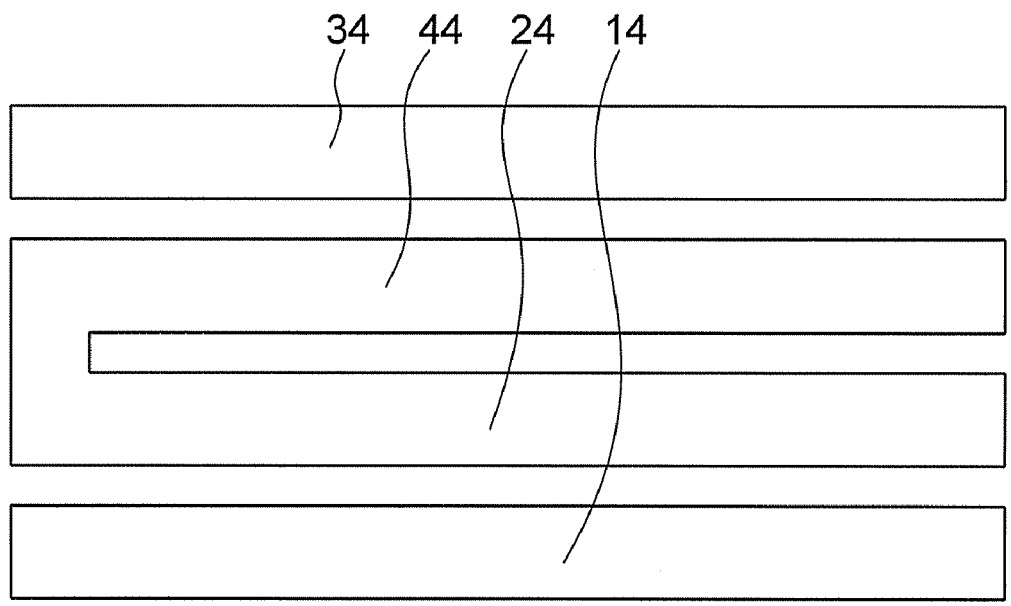
FIG. 5 is a plan view of an upper electrode in the first embodiment.

On the other hand, in the present embodiment, the lower electrodes 13, 23, 33 and 43 respectively of the first to fourth actuators 1, 2, 3 and 4 are connected together as shown in FIG. 4, whereas the upper electrode 14 of the first actuator 1 is electrically isolated (insulated) from the upper electrode 24 of the second actuator 2, and the upper electrode 34 of the third actuator 3 is electrically isolated (insulated) from the upper electrode 44 of the fourth actuator 4 as shown in FIG. 5. Although not illustrated, therefore, each of the first and second connection portions 81 and 82 has a structure obtained by laminating a lower electrode which is the same in layer as the lower electrode 13 and a piezoelectric film which is the same in layer as the piezoelectric film 15, unlike the first to fourth actuators 1, 2, 3 and 4. A support film may be formed on the piezoelectric film, or only a support film may be laminated on the lower electrode instead of the piezoelectric film. The third connection portion 83 has a unimorph structure obtained by laminating a lower electrode, a piezoelectric film, an upper electrode and a support film in the cited order in the same way as the second and fourth actuators 2 and 4. In other words, the third connection portion 83 includes a lower electrode, a piezoelectric film, an upper electrode and a support film which are the same in layer as the lower electrode 13, the piezoelectric film 15, the upper electrode 14 and the support film 16, respectively.

In the present embodiment having such a configuration, a drive voltage is applied between the upper electrode 14 and the lower electrode 13 of the first actuator 1 and between the upper electrode 34 and the lower electrode 33 of the third actuator 3. As a result, bending is caused only in the first and third actuators 1 and 3 by the electrostrictive effect. Bending is not caused in the second and fourth actuators 2 and 4. The second and fourth actuators 2 and 4 move while following the first and third actuators 1 and 3. A displacement can be generated at the action ends 22 and 42 by the electrostrictive effect.

The present embodiment is a variable capacitor. If the dielectric film 51 on the fixed electrode 5 is removed, however, the present embodiment can be used as a switch.

According to the present embodiment, it is possible to provide a piezoelectric driven MEMS device having the distance between the action end and the fixed electrode which is kept constant regardless of whether the residual strain is large or small and having a mechanism which is excellent in reproducibility and reliability, as heretofore described.

(First Modification)

A piezoelectric driven MEMS device according to a first modification of the first embodiment will now be described. The piezoelectric driven MEMS device according to the present modification differs from the first embodiment in the connection form of the lower electrode and the upper electrode of the first to fourth actuators, and consequently in the operation form of the actuators.

Figure 6:
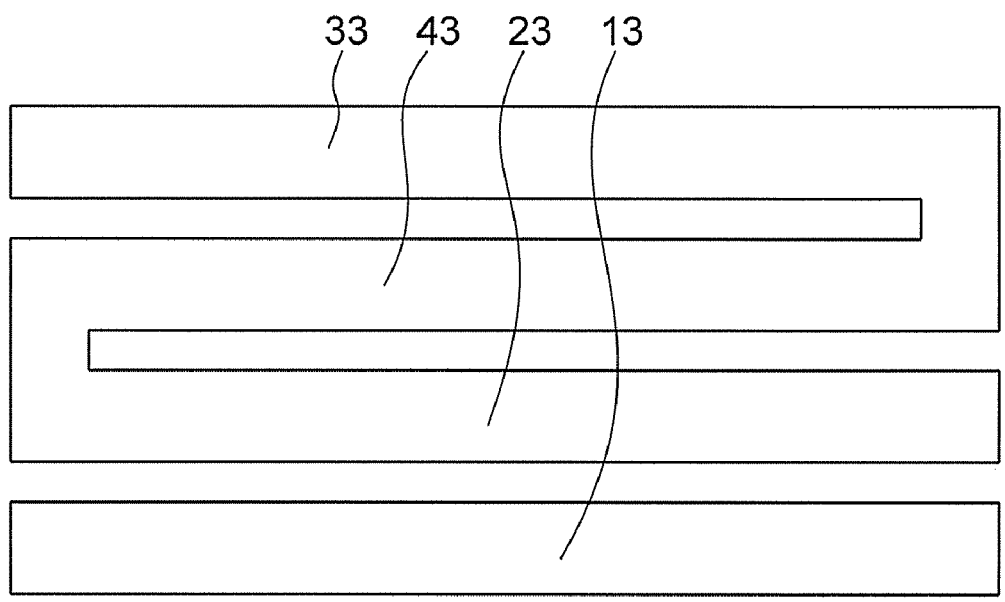
FIG. 6 is a plan view of a lower electrode in a first modification of the first embodiment.
Figure 7:
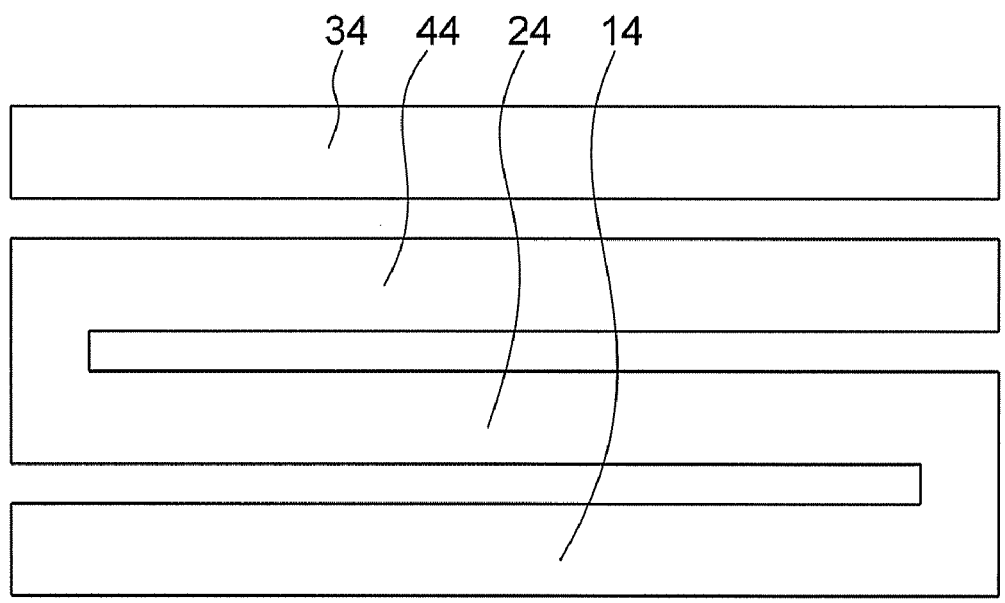
FIG. 7 is a plan view of an upper electrode in a first modification of the first embodiment.

In the present modification, the lower electrode 13 of the first actuator 1 is insulated from the lower electrode 23 of the second actuator 2, and the lower electrodes 23, 33 and 43 respectively of the second to fourth actuators 2, 3 and 4 are connected together, as shown in FIG. 6. In addition, the upper electrode 34 of the third actuator 3 is insulated from the upper electrode 44 of the fourth actuator 4, and the upper electrodes 14, 24 and 44 respectively of the first, second and fourth actuators 1, 2 and 4 are connected together, as shown in FIG. 7. Therefore, the connection portion 81 shown in FIG. 1 does not have a lower electrode, but has an upper electrode which becomes the same in layer as the upper electrode 14. The connection portion 82 has a lower electrode which becomes the same in layer as the lower electrode 13, but does not have an upper electrode. The connection portion 83 has a lower electrode which becomes the same in layer as the lower electrode 13 and an upper electrode which becomes the same in layer as the upper electrode 14, and has the same configuration as each actuator.

A first drive potential is applied to the lower electrode 13 and the upper electrode 14 of the first actuator 1, and a second drive potential which is different from the first drive potential is applied to the lower electrode 33 and the upper electrode 34 of the third actuator 3. As a result, the first or third actuator is fixed without causing bending. A voltage difference is generated only between the upper and lower electrodes of the second and fourth actuators 2 and 4, and bending is caused by the electrostrictive effect. As a result, a displacement can be generated at the action ends by the electrostrictive effect.

Comparing the first embodiment with the first modification, bending is caused in two actuators in both cases and the displacement quantity at the action end is substantially the same. Whereas displacement is caused in all of the first to fourth actuators in the first embodiment, however, displacement is caused only in the second and fourth actuators in the first modification. In the first modification, the displaced mass is small and consequently the actuation operation can be conducted faster.

The present modification is a variable capacitor. If the dielectric film 51 on the fixed electrode 5 is removed, however, the present modification can be used as a switch.

According to the present modification as well, it is possible to provide a piezoelectric driven MEMS device having the distance between the action end and the fixed electrode which is kept constant regardless of whether the residual strain is large or small and having a mechanism which is excellent in reproducibility and reliability, in the same way as the first embodiment.

(Second Modification)

Figure 8:
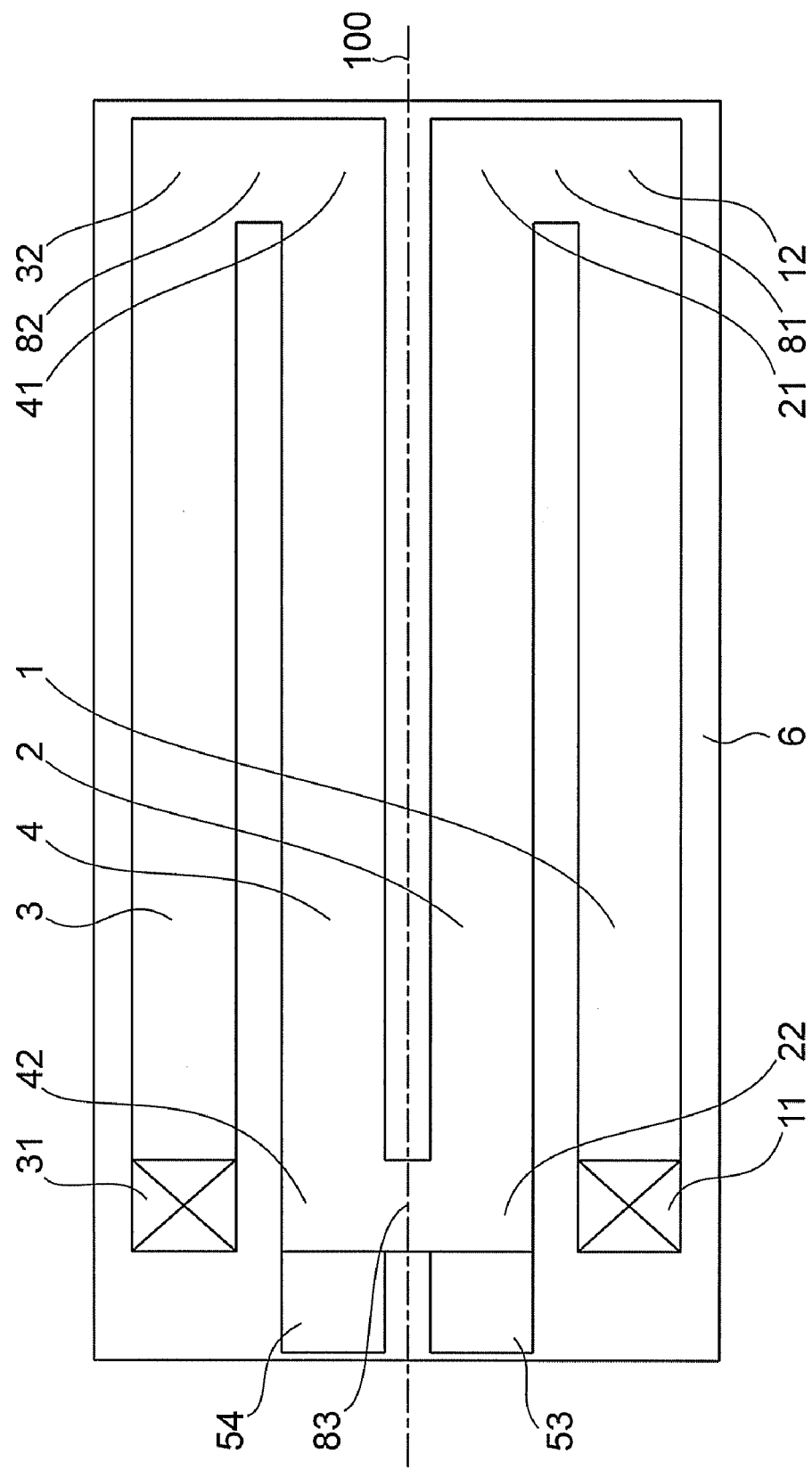
FIG. 8 is a plan view of a piezoelectric driven MEMS device according to a second modification of the first embodiment.

A piezoelectric driven MEMS device according to a third modification of the first embodiment will now be described with reference to FIG. 8. The piezoelectric driven MEMS device according to the present modification has a configuration obtained by dividing the fixed electrode 5 in the first embodiment shown in FIG. 1 into a first fixed electrode 53 and a second fixed electrode 54.

If the piezoelectric driven MEMS device is a variable capacitor (if a dielectric film is provided on the fixed electrodes 53 and 54) in the present modification, a first variable capacitor is formed between the first fixed electrode 53 and the action end 22 of the second actuator 2 and a second variable capacitor is formed between the second fixed electrode 54 and the action end 42 of the fourth actuator 4. A high frequency signal flows through the first fixed electrode 53, the first variable capacitor, the action end 22 of the second actuator, the action end 42 of the fourth actuator, the second variable capacitor and the second fixed electrode 54 in the cited order. If the piezoelectric driven MEMS device in the present modification is a switch (if a dielectric film is not provided on the fixed electrodes 53 and 54), a first switch is formed between the first fixed electrode 53 and the action end 22 of the second actuator 2 and a second switch is formed between the second fixed electrode 54 and the action end 42 of the fourth actuator 4. A high frequency signal flows in the same way as the variable capacitor.

In the piezoelectric driven MEMS device according to the first embodiment shown in FIG. 1, the high frequency signal from the fixed end 11 passes through the first actuator 1 and the second actuator 2, and arrives at the fixed end 5 via the action end 22. This results in a problem that resistances of the electrodes of the first actuator 1 and the second actuator 2 are added as serial resistance. On the other hand, the piezoelectric driven MEMS device according to the present modification has an advantage that the path for the high frequency signal is short as described above and consequently the value of the serial resistance can be made small.

On the other hand, supposing that a variable capacitor is formed in the present modification, two variable capacitors each having approximately half area are formed in series in the path of the high frequency signal, resulting in a drawback of the capacitance value becoming one fourth or less. In the case of a switch as well, the high frequency signal passes through two switches connected in series, resulting in a drawback of the contact resistance of the switch becoming twice or more.

According to the present modification as well, it is possible to provide a piezoelectric driven MEMS device having the distance between the action end and the fixed electrode which is kept constant regardless of whether the residual strain is large or small and having a mechanism which is excellent in reproducibility and reliability, in the same way as the first embodiment.

By the way, the present modification can be applied to the first modification, and a third modification, a second embodiment and a third embodiment which will be described later.

(Third Modification)

A piezoelectric driven MEMS device according to a third modification of the first embodiment will now be described with reference to FIGS. 9 and 10.

The piezoelectric driven MEMS device according to the present modification differs from the first embodiment in the connection form of the lower electrode and the upper electrode of the first to fourth actuators, and consequently in the operation form of the actuators.

Figure 9:
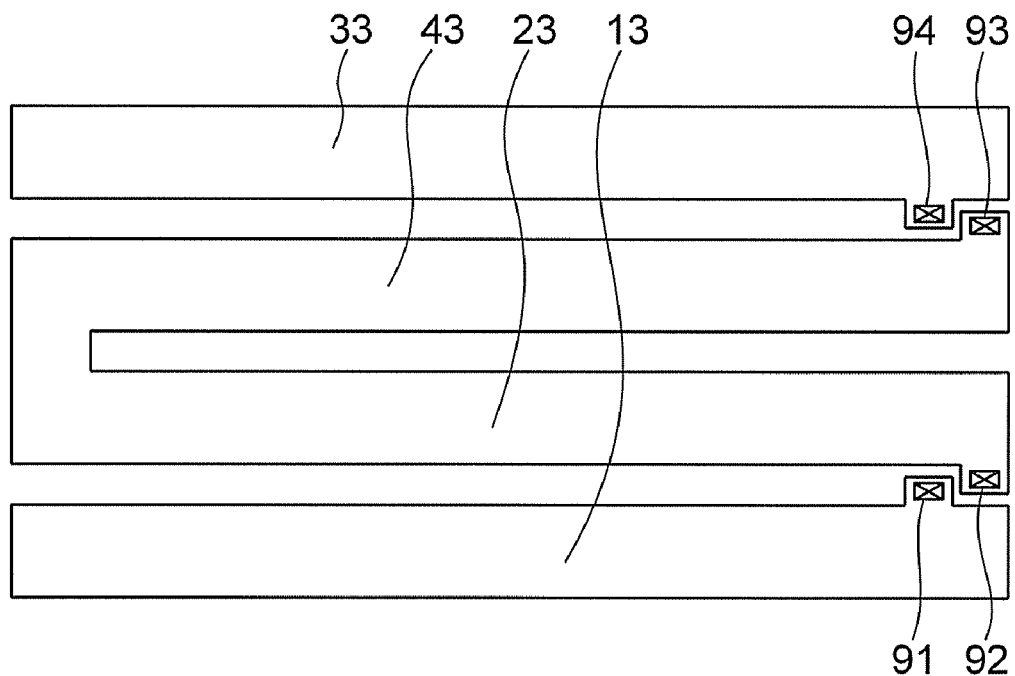
FIG. 9 is a plan view of a lower electrode in a third modification of the first embodiment.
Figure 10:
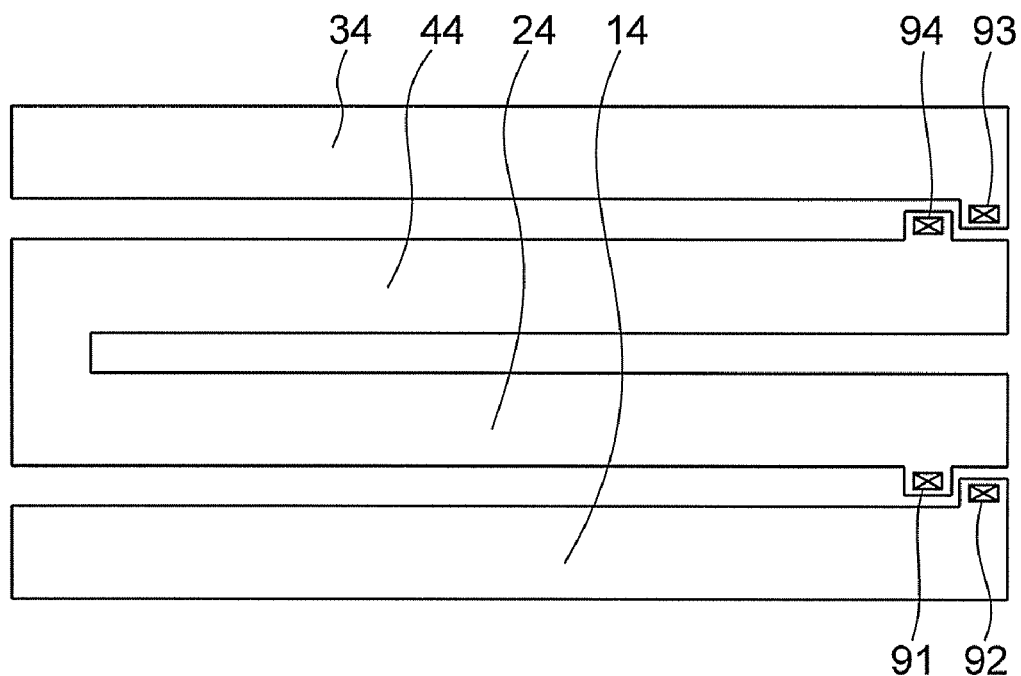
FIG. 10 is a plan view of an upper electrode in the third modification.

In the present modification, the lower electrode 13 of the first actuator 1 is insulated from the lower electrode 23 of the second actuator 2, the lower electrodes 33 of the third actuator 3 is insulated from the lower electrode 43 of the fourth actuator 4, and the lower electrode 23 of the second actuator 2 is connected to the lower electrode 43 of the fourth actuator 4, as shown in FIG. 9. Furthermore, as shown in FIG. 10, the upper electrode 14 of the first actuator 1 is insulated from the upper electrode 24 of the second actuator 2, the upper electrode 34 of the third actuator 3 is insulated from the upper electrode 44 of the fourth actuator 4, and the upper electrode 24 of the second actuator 2 is connected to the upper electrode 44 of the fourth actuator 4. Therefore, each of the connection portions 81 and 82 shown in FIG. 1 includes insulated lower electrodes and insulated upper electrodes. The connection portion 83 has a lower electrode which connects the lower electrode 23 with the lower electrode 43 and which becomes the same in layer as the lower electrode 23 and the lower electrode 43, and an upper electrode which connects the upper electrode 24 with the upper electrode 44 and which becomes the same in layer as the upper electrode 24 and the upper electrode 44. The connection portion 83 has the same configuration as each actuator.

The lower electrode 13 of the first actuator 1 is connected to the upper electrode 24 of the second actuator 2 by a via 91. The lower electrode 23 of the second actuator 2 is connected to the upper electrode 14 of the first actuator 1 by a via 92. The lower electrode 43 of the fourth actuator 4 is connected to the upper electrode 34 of the third actuator 3 by a via 93. The lower electrode 33 of the third actuator 3 is connected to the upper electrode 44 of the fourth actuator 4 by a via 94.

Therefore, a drive voltage of the same polarity is applied between the lower electrode 13 and the upper electrode 14 of the first actuator 1 and between the lower electrode 33 and the upper electrode 34 of the third actuator 3. A drive voltage of the opposite polarity is applied between the lower electrode 23 and the upper electrode 24 of the second actuator 2 and between the lower electrode 43 and the upper electrode 44 of the fourth actuator 4. The first actuator 1 and the second actuator 2 bend in the same direction. The third actuator 3 and the fourth actuator 4 bend in the opposite direction. As a result, a displacement which is nearly twice as large as that in the first embodiment is caused by the electrostrictive effect.

The present modification is a variable capacitor. If the dielectric film 51 on the fixed electrode 5 shown in FIG. 3 is removed, however, the present modification can be used as a switch.

According to the present modification as well, it is possible to provide a piezoelectric driven MEMS device having the distance between the action end and the fixed electrode which is kept constant regardless of whether the residual strain is large or small and having a mechanism which is excellent in reproducibility and reliability, in the same way as the first embodiment.

Second Embodiment

A piezoelectric driven MEMS device according to a second embodiment of the present invention will now be described. The piezoelectric driven MEMS device according to the present embodiment is the same in the arrangement of the first to fourth actuators 1, 2, 3 and 4 as that according to the first embodiment. However, the piezoelectric driven MEMS device according to the present embodiment is different in the configuration of each of the first to fourth actuators 1, 2, 3 and 4 from that according to the first embodiment. The first to fourth actuators 1, 2, 3 and 4 according to the present embodiment do not have a support film, but have three layer electrodes: lower, intermediate and upper layer electrodes, and two layer piezoelectric films: lower and upper layer piezoelectric films. The first to fourth actuators 1, 2, 3 and 4 according to the present embodiment have the so-called bimorph structure.

Figure 11:
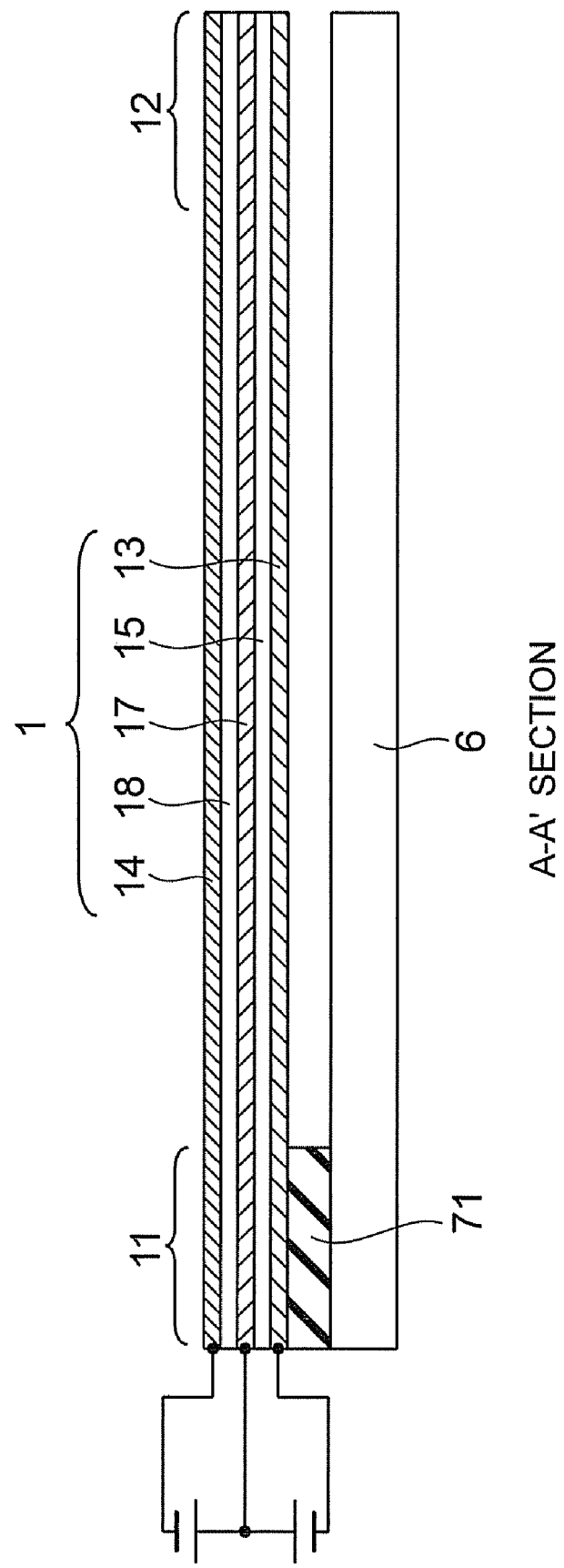
FIG. 11 is a sectional view of the piezoelectric driven MEMS device according to a second embodiment obtained by cutting it along a cut line A-A'.
Figure 12:
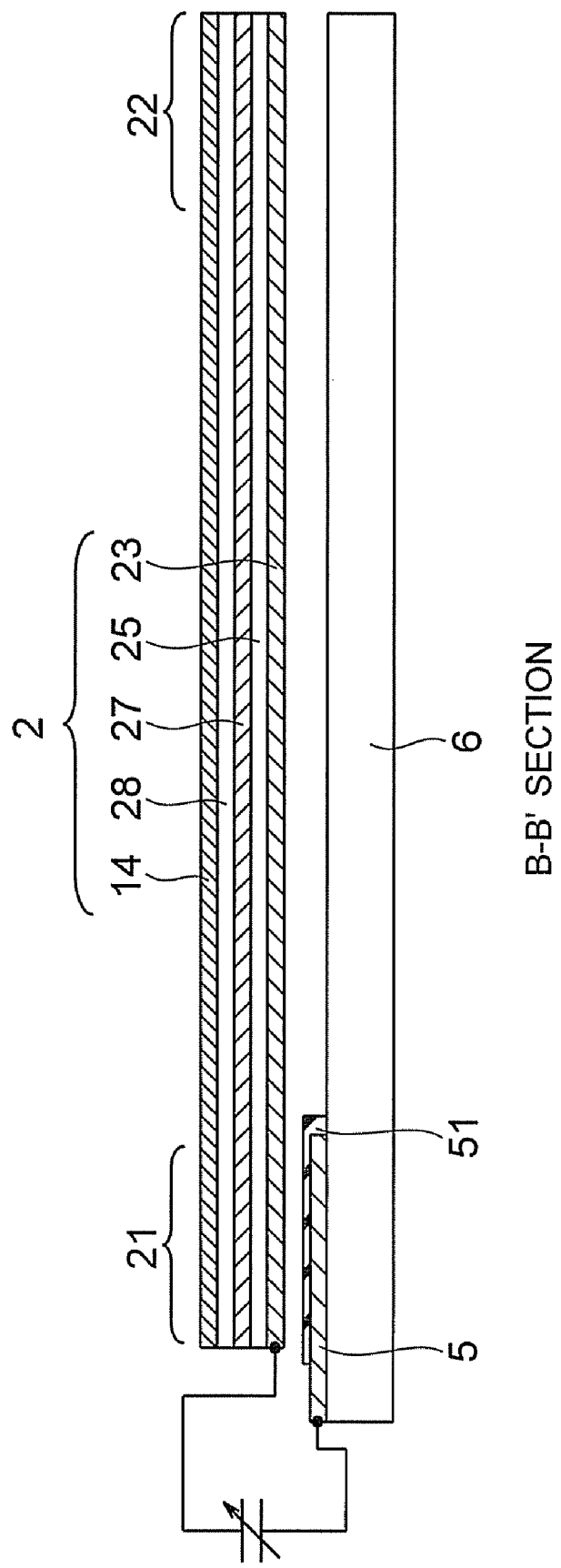
FIG. 12 is a sectional view of the piezoelectric driven MEMS device according to the second embodiment obtained by cutting it along a cut line B-B'.

As shown in FIG. 11, the first actuator 1 has a laminated structure obtained by laminating a lower electrode 13, a lower piezoelectric film 15, an intermediate electrode 17, an upper piezoelectric film 18 and an upper electrode 14 in the cited order. As shown in FIG. 12, the second actuator 2 has a laminated structure obtained by laminating a lower electrode 23 which becomes the same in layer as the lower electrode 13, a lower piezoelectric film 25 which becomes the same in layer as the lower piezoelectric film 15, an intermediate electrode 27 which becomes the same in layer as the intermediate electrode 17, an upper piezoelectric film 28 which becomes the same in layer as the upper piezoelectric film 28, and an upper electrode 24 which becomes the same in layer as the upper electrode 14. Although not illustrated, the third actuator 3 has utterly the same structure as the first actuator 1, and the fourth actuator 4 has utterly the same structure as the second actuator 2. In other words, each of the third actuator and the fourth actuator includes a lower electrode, a lower piezoelectric film, an intermediate electrode, an upper piezoelectric film and an upper electrode which are respectively the same in layer as the lower electrode 13, the lower piezoelectric film 15, the intermediate electrode 17, the upper piezoelectric film 18 and the upper electrode 14.

Figure 13:
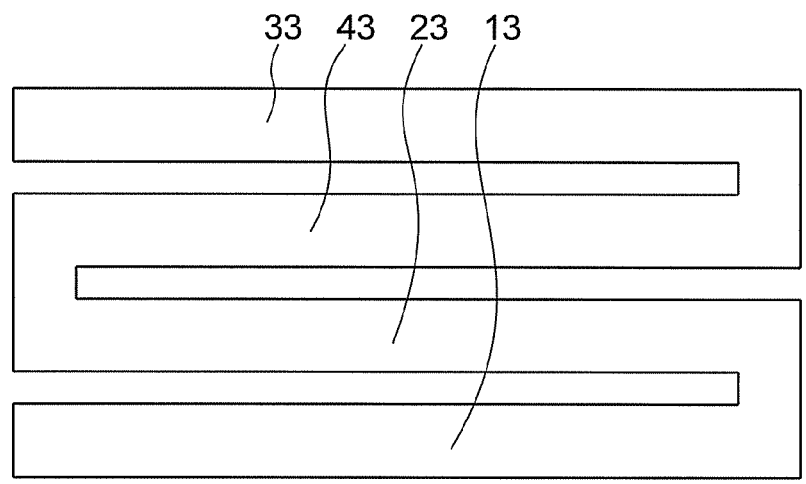
FIG. 13 is a plan view of a lower electrode in the second embodiment.
Figure 14:
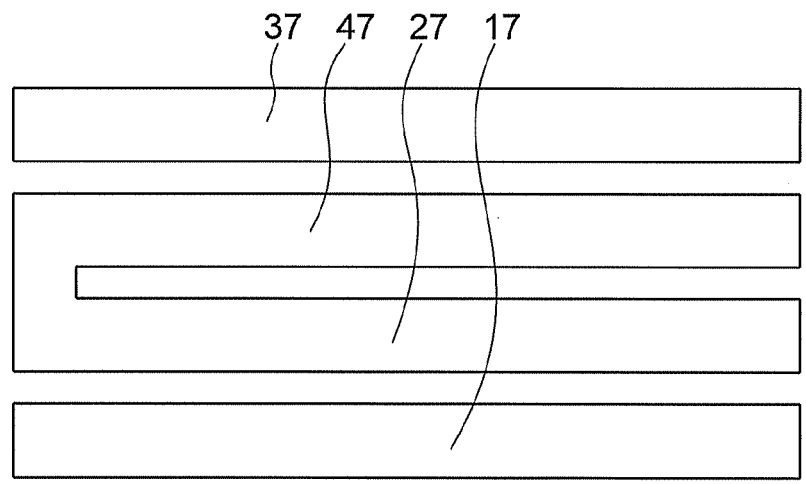
FIG. 14 is a plan view of an intermediate electrode in the second embodiment.
Figure 15:
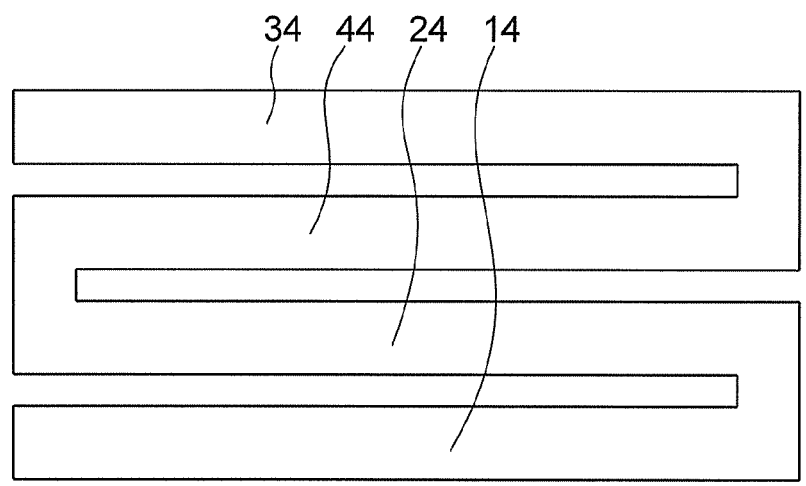
FIG. 15 is a plan view of an upper electrode in the second embodiment.

On the other hand, as shown in FIG. 13, the lower electrodes 13, 23, 33 and 43 respectively of the first to fourth actuators 1, 2, 3 and 4 are connected together. As shown in FIG. 14, the intermediate electrode 17 of the first actuator 1 is insulated from the intermediate electrode 27 of the second actuator 2, the intermediate electrode 37 of the third actuator 3 is insulated from the intermediate electrode 47 of the fourth actuator 4, and the intermediate electrode 27 is connected to the intermediate electrode 47. As shown in FIG. 15, the upper electrodes 14, 24, 34 and 44 of the first to fourth actuators are connected together. Therefore, each of the connection portions 81 and 82 shown in FIG. 1 has a structure which has a lower electrode and an upper electrode, but which does not have an intermediate electrode. The connection portion 83 has a lower electrode, an intermediate electrode, and an upper electrode. Thus, the connection portion 83 has the same structure as each of the actuators.

In such a configuration, drive voltages of opposite polarities are applied between the lower electrode 13 and the intermediate electrode 17 of the first actuator 1 and between the intermediate electrode 17 and the upper electrode 14 of the first actuator 1. Drive voltages of opposite polarities are applied between the lower electrode 33 and the intermediate electrode 37 of the third actuator 3 and between the intermediate electrode 37 and the upper electrode 34 of the third actuator 3. Here, the polarity of the voltage between the lower electrode 13 and the intermediate electrode 17 is the same as the polarity of the voltage between the lower electrode 33 and the intermediate electrode 37. The polarity of the voltage between the intermediate electrode 17 and the upper electrode 14 is the same as the polarity of the voltage between the intermediate electrode 37 and the upper electrode 34.

As a result, the lower piezoelectric film 15 of the first actuator 1 contracts (or extends) and the upper piezoelectric film 18 extends (or contracts), and consequently bending is caused in the first actuator 1. The lower piezoelectric film 35 of the third actuator 3 contracts (or extends) and the upper piezoelectric film 38 extends (or contracts), and consequently bending is caused in the third actuator 3. Thus, operation is conducted in the same way as the first embodiment. In other words, bending is caused only in the first and third actuators 1 and 3 by the electrostrictive effect. Bending is not caused in the second and fourth actuators 2 and 4. The second and fourth actuators 2 and 4 move while following the first and third actuators 1 and 3. A displacement is generated at the action ends by the electrostrictive effect.

The present embodiment is a variable capacitor. If the dielectric film 51 on the fixed electrode 5 is removed, however, the present embodiment can be used as a switch.

According to the present embodiment as well, therefore, it is possible to provide a piezoelectric driven MEMS device having the distance between the action end and the fixed electrode which is kept constant regardless of whether the residual strain is large or small and having a mechanism which is excellent in reproducibility and reliability, in the same way as the first embodiment.

The second embodiment will now be compared with the first embodiment. In the bimorph actuator according to the second embodiment, a displacement quantity which is approximately twice that in the unimorph actuator according to the first embodiment can be anticipated, but there is also a drawback that the number of laminates increases.

Third Embodiment

A piezoelectric driven MEMS device according to a third embodiment of the present invention will now be described with reference to FIGS. 16 to 19.

Figure 16:
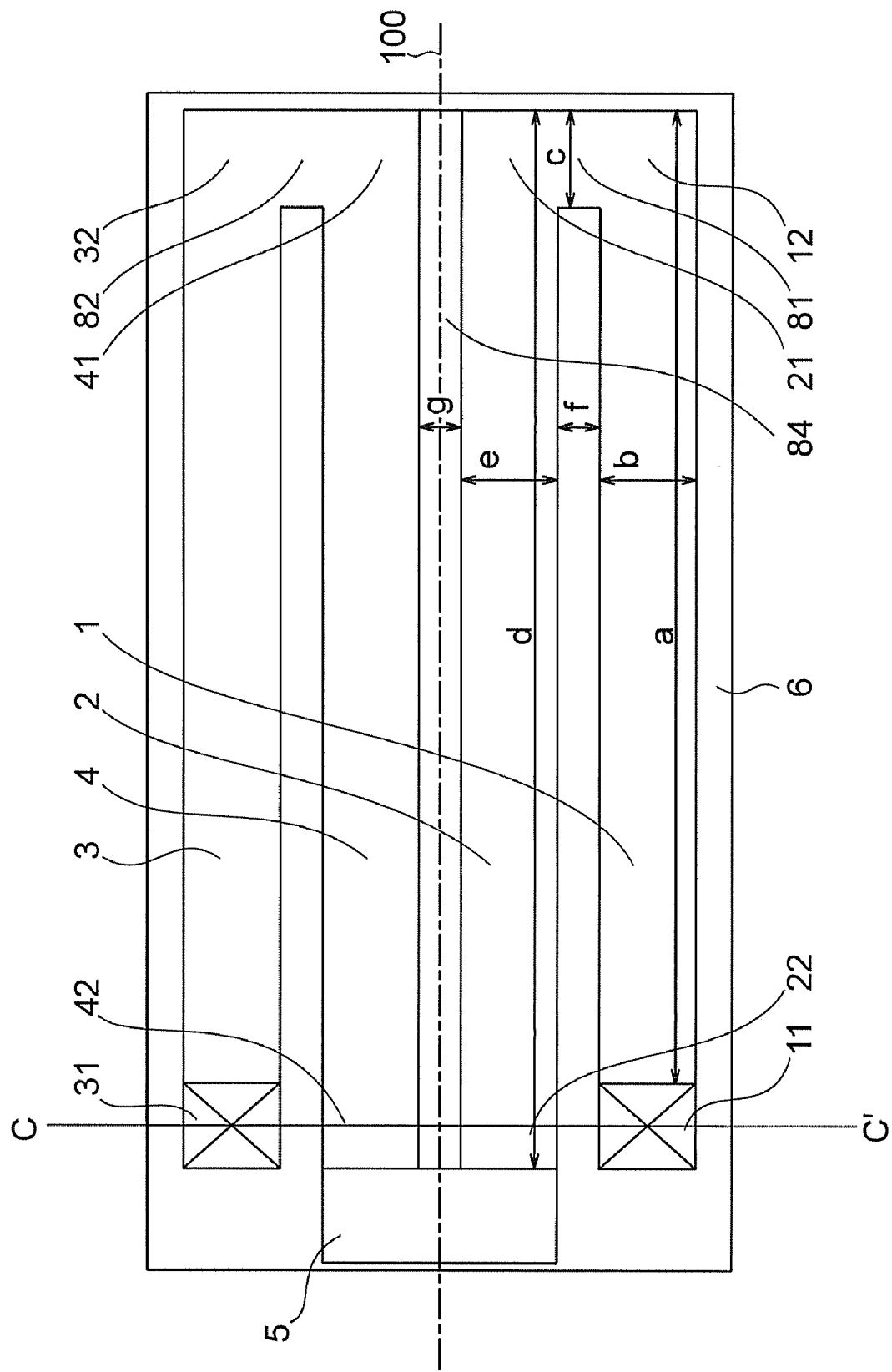
FIG. 16 is a plan view of a piezoelectric driven MEMS device according to a third embodiment of the present invention.

The piezoelectric driven MEMS device according to the present embodiment is a variable capacitor, and includes first to fourth actuators (beams) 1, 2, 3 and 4 as shown in FIG. 16. The second to fourth actuators 2, 3 and 4 are provided in parallel with the first actuator 1, and have the same length (dimension in a direction of extension of the actuators (lengthwise direction)) as that of the first actuator 1. A first end of the first actuator 1 is a fixed end 11, and it is fixed to a substrate 6 through an anchor 71. A second end (connection end) 12 of the first actuator is connected to a first end 21 of the second actuator 2 by a first connection portion 81. A second end 22 of the second actuator 2 is a first action end, and a movable electrode is provided thereon. A first end of the third actuator 3 is a fixed end 31, and it is fixed to the substrate 6 through an anchor 72. A second end (connection end) 32 of the third actuator is connected to a first end 41 of the fourth actuator 4 by a second connection portion 82. A second end 42 of the fourth actuator 4 is a second action end, and a movable electrode is provided thereon. In addition, the second actuator 2 is connected to the fourth actuator 4 by a third connection portion 84.

The fixed end 31 is located on a straight line which passes through the fixed end 11 and which is substantially perpendicular to an extension direction of the first actuator 1. The width of the first actuator 1 is substantially equal to the width of the third actuator 3. The width of the second actuator 2 is substantially equal to the width of the fourth actuator 4.

Figure 17:
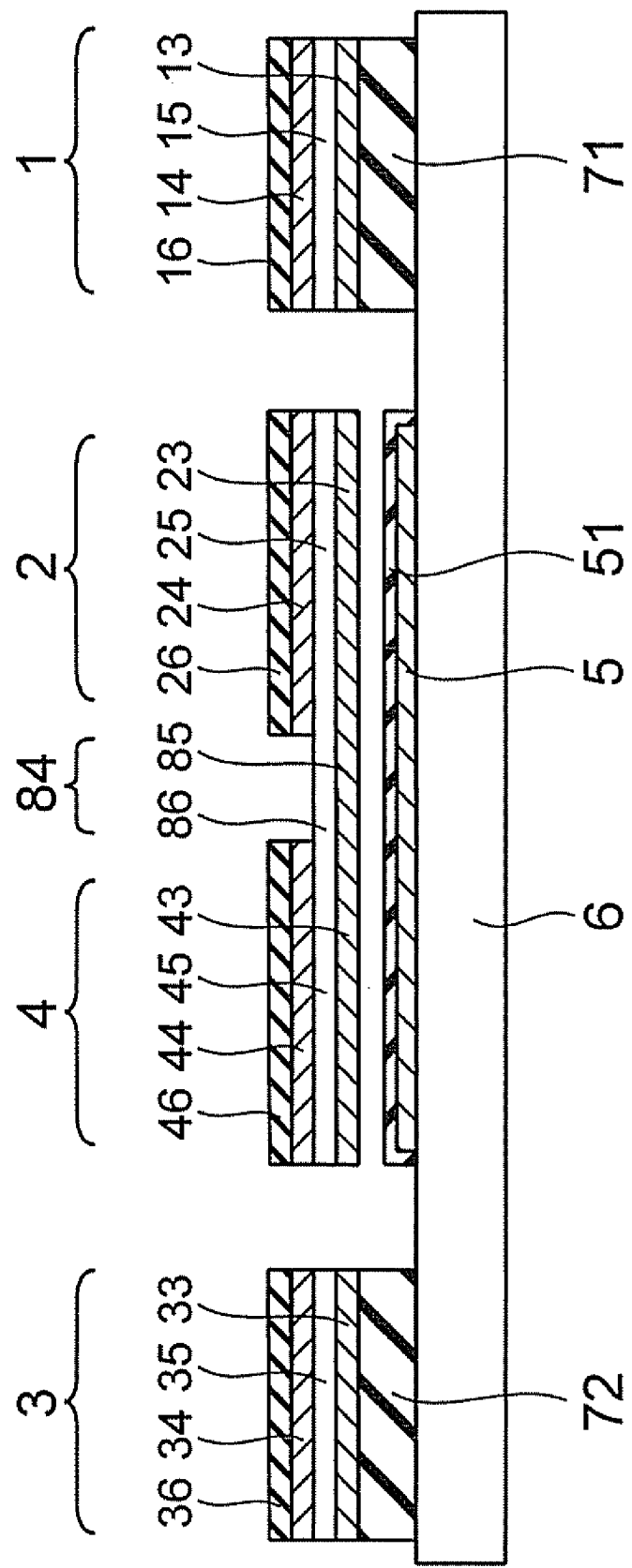
FIG. 17 is a sectional view of the piezoelectric driven MEMS device according to the third embodiment obtained by cutting it along a cut line C-C' shown in FIG. 16.

As shown in FIG. 17, the first actuator 1 has a unimorph structure obtained by laminating a lower electrode 13, a piezoelectric film 15, an upper electrode 14 and a support film 16 in the cited order. The second actuator 2 has a unimorph structure obtained by laminating a lower electrode 23 which is the same in layer as the lower electrode 13, a piezoelectric film 25 which is the same in layer as the piezoelectric film 15, an upper electrode 24 which is the same in layer as the upper electrode 14, and a support film 26 which is the same in layer as the support film 16 in the cited order. The third actuator 3 has utterly the same structure as the first actuator 1. The fourth actuator 4 has utterly the same structure as the second actuator 2. In other words, each of the third actuator and the fourth actuator includes a lower electrode, a piezoelectric film, an upper electrode and a support film which are the same in layer as the lower electrode 13, the piezoelectric film 15, the upper electrode 14, and the support film 16, respectively.

The second actuator 2 and the fourth actuator 4 are connected at opposed side faces by the third connection portion 84. The third connection portion 84 includes two layers: a lower electrode 85 which is the same in layer as the lower electrodes 23 and 43, and a piezoelectric film 86 which is the same in layer as the piezoelectric films 25 and 45. The third connection portion 84 is thin and small in rigidity as compared with the four-layer structure of the main body of each actuator. On the substrate 6, a fixed electrode 5 and a shortcircuit preventing dielectric film 51 are formed so as to be opposed to the first action end 22 and the second action end 42.

In the present embodiment, the first actuator 1 and the second actuator 2 are disposed so as to be line-symmetrical to the third actuator 3 and the fourth actuator 4 about a central line 100 between the second actuator 2 and the fourth actuator 4. As for examples of sizes of the actuators, a length "a" between the fixed end and the connection end 12 or 32 in each of the first and third actuators 1 and 3 is 480 μm, a width "b" of the first and third actuators 1 and 3 is 90 μm, a length "c" of the first and second connection portions 81 and 82 is 80 μm, a length "d" of the second and fourth actuators 2 and 4 is 560 μm, a width "e" of the second and fourth actuators 2 and 4 is 70 μm, each of a distance (space) f between the first actuator 1 and the second actuator 2 and a distance f between the third actuator 3 and the fourth actuator 4 is 20 μm, and a distance g between the second actuator 2 and the fourth actuator 4 is 40 μm.

If vertically asymmetric residual strains are caused at the time of film forming, a warp is caused in each of the first to fourth actuators 1, 2, 3 and 4 according to the magnitude of the residual strain. With regard to the lengthwise direction of the actuators, however, the warp in the first actuator 1 and the warp in the second actuator 2 are canceled each other, and the warp in the third actuator 3 and the warp in the fourth actuator 4 are canceled each other. With regard to the lateral direction of the actuators, the first actuator 1 and the second actuator 2 are connected together by the first connection portion 81, and the third actuator 3 and the fourth actuator 4 are connected together by the second connection portion 82. In addition, the second actuator 2 and the fourth actuator 4 are connected together by the third connection portion 83 which is small in rigidity. Therefore, warps in the lateral direction are also canceled, and it becomes possible to keep the action end 22 and the action end 42 at substantially the same height as the fixed end 11 and the fixed end 31.

Figure 18:
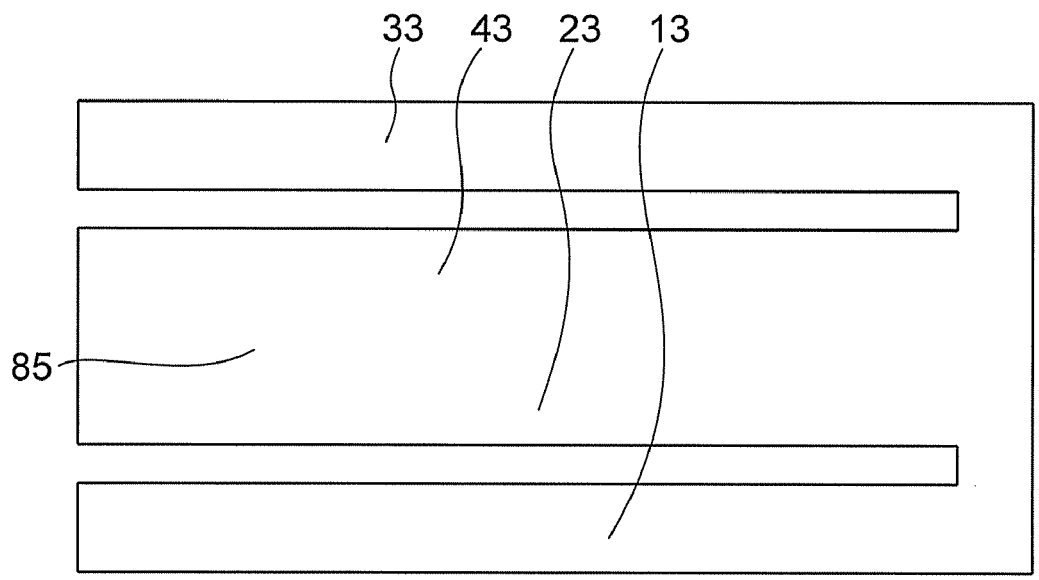
FIG. 18 is a plan view of a lower electrode in the third embodiment.
Figure 19:
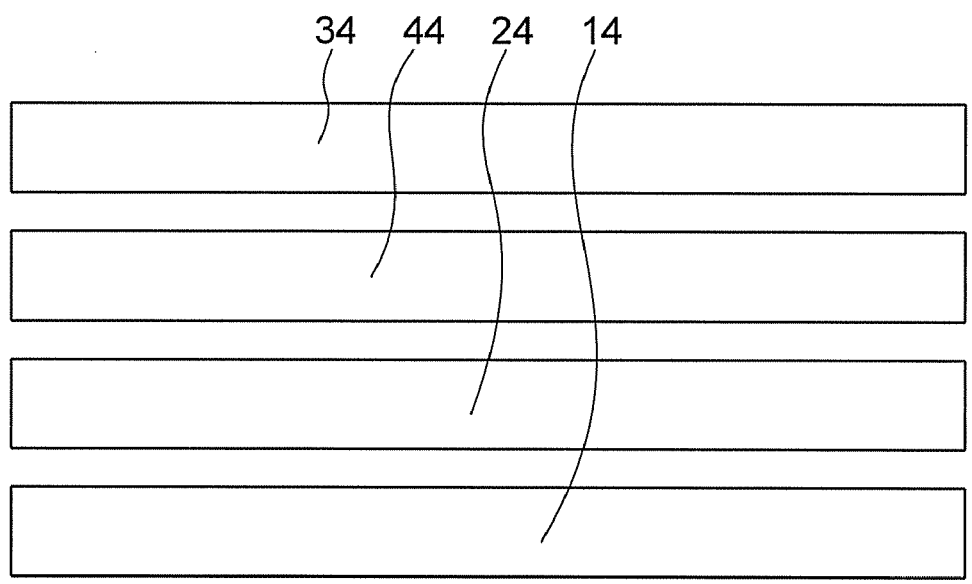
FIG. 19 is a plan view of an upper electrode in the third embodiment.

On the other hand, in the present embodiment, the lower electrodes 13, 23, 33 and 43 respectively of the first to fourth actuators 1, 2, 3 and 4 are connected together as shown in FIG. 18, whereas the upper electrodes 14, 24, 34 and 44 respectively of the first to fourth actuators 1 to 4 are electrically insulated from each other as shown in FIG. 19. In other words, the lower electrode 85 of the third connection portion 84 connects the lower electrode 23 to the lower electrode 43.

In the present embodiment, a drive voltage is applied between the upper electrode 14 and the lower electrode 13 of the first actuator 1 and between the upper electrode 34 and the lower electrode 33 of the third actuator 3. As a result, bending is caused only in the first and third actuators 1 and 3 by the electrostrictive effect. Bending is not caused in the second and fourth actuators 2 and 4. The second and fourth actuators 2 and 4 move while following the first and third actuators 1 and 3. A displacement can be generated at the action ends by the electrostrictive effect. By the way, each of the connection portions 81 and 82 shown in FIG. 16 has a structure which has a lower electrode, but does not have an upper electrode.

The present embodiment is a variable capacitor. If the dielectric film 51 on the fixed electrode 5 is removed, however, the present embodiment can be used as a switch.

According to the present embodiment, it is possible to provide a piezoelectric driven MEMS device having the distance between the action end and the fixed electrode which is kept constant regardless of whether the residual strain is large or small and having a mechanism which is excellent in reproducibility and reliability, as heretofore described.

Comparing the third embodiment with the first embodiment, they are different in the structure of the connection portion for connecting the second actuator to the fourth actuator. However, they are substantially equivalent in action as an actuator and warp suppression effect. Therefore, any structure may be adopted, and it is also possible to use the structures of both connection portions jointly.

According to the embodiments of the present invention, it is possible to provide a piezoelectric driven MEMS device having the distance between the action end and the fixed electrode which is kept constant regardless of whether the residual strain is large or small and having a mechanism which is excellent in reproducibility and reliability, as heretofore described in detail.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A piezoelectric driven MEMS device comprising:
a substrate;
a first actuator which comprises a first lower electrode, a first piezoelectric film formed on the first lower electrode, and a first upper electrode formed on the first piezoelectric film, and which has a first end fixed onto the substrate;
a second actuator which is disposed on the substrate in parallel with the first actuator, and which comprises a second lower electrode, a second piezoelectric film formed on the second lower electrode, and a second upper electrode formed on the second piezoelectric film;
a first connection portion which connects a second end of the first actuator to a first end of the second actuator opposed to the second end of the first actuator;
a third actuator which is disposed on the opposite side of the second actuator from the first actuator and in parallel with the first actuator, which comprises a third lower electrode, a third piezoelectric film formed on the third lower electrode, and a third upper electrode formed on the third piezoelectric film, and which has a first end fixed onto the substrate;
a fourth actuator which is disposed on the substrate between the second actuator and the third actuator and in parallel with the third actuator, which comprises a fourth lower electrode, a fourth piezoelectric film formed on the fourth lower electrode, and a fourth upper electrode formed on the fourth piezoelectric film;
a second connection portion which connects a second end of the third actuator to a first end of the fourth actuator opposed to the second end of the third actuator;
a third connection portion which connects a second end of the second actuator to a second end of the fourth actuator; and
a fixed electrode formed on the substrate so as to be opposed to the second ends of the second actuator and the fourth actuator,
the first actuator and the second actuator being disposed so as to be substantially symmetrical to the third actuator and the fourth actuator about a central line between the second actuator and the fourth actuator.

2. The MEMS device according to claim 1, wherein the third connection portion comprises a fifth lower electrode connected to the second and fourth lower electrodes, and a fifth upper electrode insulated from the fifth lower electrode and formed on the fifth lower electrode.

3. The MEMS device according to claim 1, wherein
the first end of the third actuator is located on a straight line which passes through the first end of the first actuator and which is substantially perpendicular to an extension direction of the first actuator,
a length of the first actuator is substantially equal to a length of the third actuator, a width of the first actuator is substantially equal to a width of the third actuator,
a length of the second actuator is substantially equal to a length of the fourth actuator, and
a width of the second actuator is substantially equal to a width of the fourth actuator.

4. The MEMS device according to claim 1, wherein
the first connection portion comprises a sixth lower electrode connected to the first and second lower electrodes,
the second connection portion comprises a seventh lower electrode connected to the third and fourth lower electrodes, and
the first and second upper electrodes are insulated from each other, and the third and fourth upper electrodes are insulated from each other.

5. The MEMS device according to claim 1, wherein
the first connection portion comprises a sixth upper electrode connected to the first and second upper electrodes,
the second connection portion comprises a seventh lower electrode connected to the third and fourth lower electrodes, and
the first and second lower electrodes are insulated from each other, and the third and fourth upper electrodes are insulated from each other.

6. The MEMS device according to claim 1, wherein
the first and second lower electrodes are insulated from each other, the third and fourth lower electrodes are insulated from each other, the first and second upper electrodes are insulated from each other, and the third and fourth upper electrodes are insulated from each other, and
the first lower electrode is connected to the second upper electrode, the second lower electrode is connected to the first upper electrode, the third lower electrode is connected to the fourth upper electrode, and the fourth lower electrode is connected to the third upper electrode.

7. The MEMS device according to claim 1, wherein the fixed electrode comprises a first fixed electrode formed so as to be opposed to the second end of the second actuator, and a second fixed electrode formed so as to be opposed to the second end of the fourth actuator and insulated from the first fixed electrode.

8. A piezoelectric driven MEMS device comprising:
a substrate;
a first actuator which comprises a first lower electrode, a first lower piezoelectric film formed on the first lower electrode, a first intermediate electrode formed on the first lower piezoelectric film, a first upper piezoelectric film formed on the first intermediate electrode, and a first upper electrode formed on the first upper piezoelectric film, and which has a first end fixed onto the substrate;
a second actuator which is disposed on the substrate in parallel with the first actuator, and which comprises a second lower electrode, a second lower piezoelectric film formed on the second lower electrode, a second intermediate electrode formed on the second lower piezoelectric film, a second upper piezoelectric film formed on the second intermediate electrode, and a second upper electrode formed on the second upper piezoelectric film;
a first connection portion which connects a second end of the first actuator to a first end of the second actuator opposed to the second end of the first actuator;
a third actuator which is disposed on the opposite side of the second actuator from the first actuator and in parallel with the first actuator, which comprises a third lower electrode, a third lower piezoelectric film formed on the third lower electrode, a third intermediate electrode formed on the third lower piezoelectric film, a third upper piezoelectric film formed on the third intermediate electrode, and a third upper electrode formed on the third upper piezoelectric film, and which has a first end fixed onto the substrate;
a fourth actuator which is disposed on the substrate between the second actuator and the third actuator and in parallel with the third actuator, which comprises a fourth lower electrode, a fourth lower piezoelectric film formed on the fourth lower electrode, a fourth intermediate electrode formed on the fourth lower piezoelectric film, a fourth upper piezoelectric film formed on the fourth intermediate electrode, and a fourth upper electrode formed on the fourth upper piezoelectric film;
a second connection portion which connects a second end of the third actuator to a first end of the fourth actuator opposed to the second end of the third actuator;
a third connection portion which connects a second end of the second actuator to a second end of the fourth actuator; and
a fixed electrode formed on the substrate so as to be opposed to the second ends of the second actuator and the fourth actuator,
the first actuator and the second actuator being disposed so as to be substantially symmetrical to the third actuator and the fourth actuator about a central line between the second actuator and the fourth actuator.

9. The MEMS device according to claim 8, wherein the third connection portion comprises a fifth lower electrode connected to the second and fourth lower electrodes, a fifth intermediate electrode formed on the fifth lower electrode, and a fifth upper electrode insulated from the fifth intermediate electrode and formed on the fifth intermediate electrode.

10. The MEMS device according to claim 8, wherein
the first end of the third actuator is located on a straight line which passes through the first end of the first actuator and which is substantially perpendicular to an extension direction of the first actuator,
a length of the first actuator is substantially equal to a length of the third actuator,
a width of the first actuator is substantially equal to a width of the third actuator,
a length of the second actuator is substantially equal to a length of the fourth actuator, and
a width of the second actuator is substantially equal to a width of the fourth actuator.

11. The MEMS device according to claim 8, wherein
the first connection portion comprises a sixth lower electrode connected to the first and second lower electrodes, and a sixth upper electrode connected to the first and second upper electrodes,
the second connection portion comprises a seventh lower electrode connected to the third and fourth lower electrodes, and a seventh upper electrode connected to the third and fourth upper electrodes, the first and second intermediate electrodes are insulated from each other, and the third and fourth intermediate electrodes are insulated from each other.

12. The MEMS device according to claim 8, wherein the fixed electrode comprises a first fixed electrode formed so as to be opposed to the second end of the second actuator, and a second fixed electrode formed so as to be opposed to the second end of the fourth actuator and insulated from the first fixed electrode.

13. A piezoelectric driven MEMS device comprising:
a substrate;
a first actuator which comprises a first lower electrode, a first piezoelectric film formed on the first lower electrode, and a first upper electrode formed on the first piezoelectric film, and which has a first end fixed onto the substrate;
a second actuator which is disposed on the substrate in parallel with the first actuator, and which comprises a second lower electrode, a second piezoelectric film formed on the second lower electrode, and a second upper electrode formed on the second piezoelectric film;
a first connection portion which connects a second end of the first actuator to a first end of the second actuator opposed to the second end of the first actuator;
a third actuator which is disposed on the opposite side of the second actuator from the first actuator and in parallel with the first actuator, which comprises a third lower electrode, a third piezoelectric film formed on the third lower electrode, and a third upper electrode formed on the third piezoelectric film, and which has a first end fixed onto the substrate;
a fourth actuator which is disposed on the substrate between the second actuator and the third actuator and in parallel with the third actuator, which comprises a fourth lower electrode, a fourth piezoelectric film formed on the fourth lower electrode, and a fourth upper electrode formed on the fourth piezoelectric film;
a second connection portion which connects a second end of the third actuator to a first end of the fourth actuator opposed to the second end of the third actuator;
a third connection portion which connects opposed side faces of the second actuator and the fourth actuator together; and
a fixed electrode formed on the substrate so as to be opposed to second ends of the second actuator and the fourth actuator,
the first actuator and the second actuator being disposed so as to be substantially symmetrical to the third actuator and the fourth actuator about a central line between the second actuator and the fourth actuator.

14. The MEMS device according to claim 13, wherein the third connection portion comprises a fifth lower electrode connected to the second and fourth lower electrodes, and a fifth piezoelectric film formed on the fifth lower electrode.

15. The MEMS device according to claim 13, wherein
the first end of the third actuator is located on a straight line which passes through the first end of the first actuator and which is substantially perpendicular to an extension direction of the first actuator,
a length of the first actuator is substantially equal to a length of the third actuator,
a width of the first actuator is substantially equal to a width of the third actuator,
a length of the second actuator is substantially equal to a length of the fourth actuator, and
a width of the second actuator is substantially equal to a width of the fourth actuator.

16. The MEMS device according to claim 13, wherein
the first connection portion comprises a sixth lower electrode connected to the first and second lower electrodes,
the second connection portion comprises a seventh lower electrode connected to the third and fourth lower electrodes, and
the first and second upper electrodes are insulated from each other, and the third and fourth upper electrodes are insulated from each other.

17. The MEMS device according to claim 13, wherein the fixed electrode comprises a first fixed electrode formed so as to be opposed to the second end of the second actuator, and a second fixed electrode formed so as to be opposed to the second end of the fourth actuator and insulated from the first fixed electrode.

18. The MEMS device according to claim 1, wherein the MEMS device is a variable capacitor.

19. The MEMS device according to claim 1, wherein the MEMS device is a switch.

20. The MEMS device according to claim 8, wherein the MEMS device is a variable capacitor.

21. The MEMS device according to claim 8, wherein the MEMS device is a switch.

* * * * *